United States Patent [19]

Jewel

[11] Patent Number: 5,852,683
[45] Date of Patent: Dec. 22, 1998

[54] METHOD FOR AUTOMATIC IMAGE MERGE

[75] Inventor: Tsai Jewel, Hsinchu, Taiwan

[73] Assignee: Mustek Systems, Inc., Taiwan

[21] Appl. No.: 713,824

[22] Filed: Sep. 13, 1996

[51] Int. Cl.$^6$ ................................................. H04N 5/225
[52] U.S. Cl. .................... 382/284; 382/155; 382/156; 382/159; 382/160; 382/161; 382/205; 382/282; 382/286; 382/287; 382/293; 382/300; 382/303; 348/659; 348/660
[58] Field of Search .................................... 382/284, 293, 382/282, 286, 287, 155, 156, 159, 160, 161, 205, 303, 300; 348/659, 660

[56] References Cited

U.S. PATENT DOCUMENTS

| 5,479,533 | 12/1995 | Tanaka | 382/161 |
| 5,544,279 | 8/1996 | Li et al. | 395/3 |
| 5,611,033 | 3/1997 | Pitteloud et al. | 395/135 |
| 5,649,032 | 7/1997 | Burt et al. | 382/284 |
| 5,668,897 | 9/1997 | Stolfo | 382/283 |

Primary Examiner—Leo H. Boudreau
Assistant Examiner—Kanji Patel
Attorney, Agent, or Firm—Pennie & Edmonds, LLP

[57] ABSTRACT

A method for automatic merging two images having overlapped parts for a handy scanner. The method starts from defining a meaningful sample in a first image using fuzzy logic. Then, a two level searches based on A* algorithm are executed thereafter to find a match point in the second image. After the match point is found, the two images are stitched together using linear interpolation.

18 Claims, 10 Drawing Sheets

| R$_4$ C$_{11}$ | R$_2$ C$_{12}$ | R$_7$ C$_{13}$ | |
|---|---|---|---|
| R$_1$ C$_{21}$ | R$_P$ C$_{22}$ | R$_6$ C$_{23}$ | |
| R$_5$ C$_{31}$ | R$_3$ C$_{32}$ | R$_8$ C$_{33}$ | |
| | | | |

Fig.5A

| R/C | 1 | 2 | 3 | 4 | 5 | 6 | 7 | 8 | 9 →16 |
|---|---|---|---|---|---|---|---|---|---|
| 1 | N$_0$ | | N"$_4$ | | N$_2$ | | N"$_7$ | | → |
| 2 | | | | | | | | | → |
| 3 | N'$_4$ | | N$_7$/N'$_7$/N"$_6$ | | N$_5$/N"$_5$ | | N$_{10}$/N"$_8$ | | → |
| 4 | | N$_{15}$ | N$_{13}$ | N$_{18}$ | | | | | → |
| 5 | N$_1$ | N$_{12}$ | N$_4$/N'$_6$ | N$_{17}$ | N$_3$ | | N$_9$ | | → |
| 6 | | N$_{16}$ | N$_{14}$ | N$_{19}$ | | | | | → |
| 7 | N'$_5$ | | N$_8$/N'$_8$ | | N$_6$ | | N$_{11}$ | | → |
| 8 | | | | | | | | | → |
| 9↓16 | ↓ | ↓ | ↓ | ↓ | ↓ | ↓ | ↓ | ↓ | ↓ |

Fig.5B

METHOD FOR AUTOMATIC IMAGE MERGE

BACKGROUND OF THE INVENTION

1. Field of the Invention

The invention relates to a method of automatic image merge, especially to an image merging method used in the handy scanners.

2. Description of the Prior Art

Due to the size of a handy scanner, a handy scanner has to scan an image more than once if the width of that image is larger than 4.13 inches. Thus, the function of image merging becomes an indispensable part of a handy scanner. It can merge two connected images seamlessly and then return a whole image. A conventional image matching provides three modes for operating image matching: manual, semi-automatic and fully automatic. Nevertheless, the automatic mode of the handy scanner is not popular because it is not reliable. Sometimes, a user may wait for minutes for the result, or worse, without any result. For this reason, most users would rather use manual or semi-automatic mode to merge their images. Consequently, although the results are improved, the user may have spent much more effort on the image merging than what they should have done on image processing.

There are several reasons for the malfunction of the automatic image. For one thing, its sample selection is too simple. For another thing, its search speed is too slow. It may start from selecting one area in the left image as a sample and then dividing the right image into several areas of the same size to compare with the sample in sequential order. Nevertheless, if an area of all white or all black is selected as a sample, the search that follows will be totally in vain.

SUMMARY OF THE INVENTION

Accordingly, it is an object of the present invention to provide a method for automatic image merge which can speed up the process of image matching by selecting a meaningful sample.

It is another object of the present invention to provide a method for automatic image merge which applies the technique of artificial intelligence to improve the accuracy of image matching and the search speed.

It is a further object of the present invention to provide a method for automatic image merge to enhance the functions provided by a handy scanner.

Briefly described, the present invention encompasses a method of automatic image merge which includes the following steps: (1) read a first image data and a second image data; (2) select a meaningful sample from the second image; (3) execute level-I search to select a 16×16 array of pixels as a region in the first image whose estimate is roughly close to the sample;(4) execute level-II search in the region to select an 8×8 array of pixels as a node and compare the node with the sample;(5) repeat step (4) until a best node is found or all nodes in the region have been examined; (5) repeat step (3) until a best node is found or the search space for the first image is exhausted; (6) if a best node is found, use linear interpolation to merge the two images according to the match point found.

BRIEF DESCRIPTION OF THE DRAWINGS

These and other objects and advantages of the present invention will become apparent by reference to the following description and accompanying drawings wherein:

FIG. 5A is a schematic diagram showing the creation of child regions according to the method of the invention.

FIG. 5B is a schematic diagram showing a sample region according to the method of the invention.

DETAILED DESCRIPTION OF THE PREFERRED EMBODIMENTS

Figure 1:
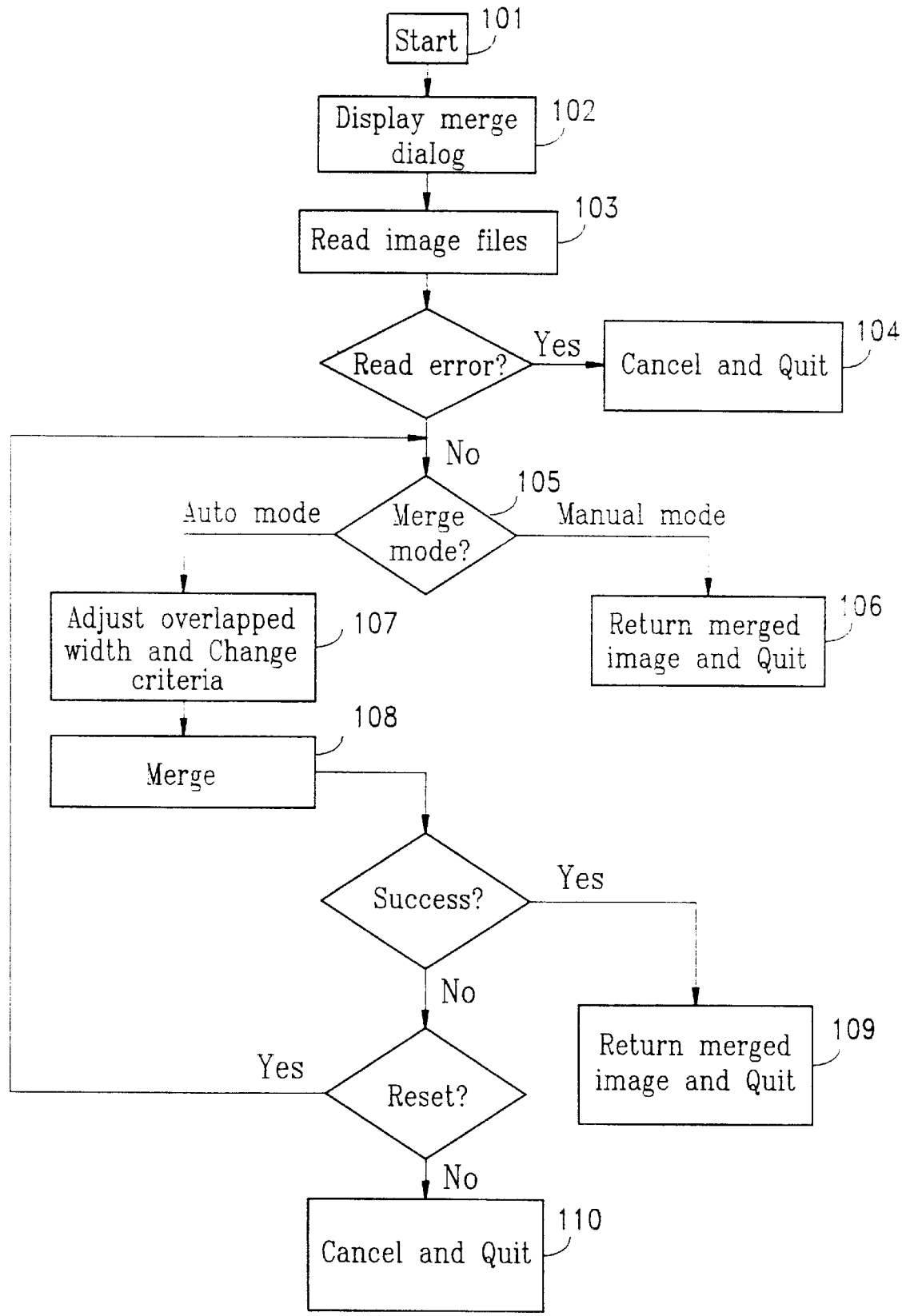
FIG. 1 is a flow chart showing the control flow of the preferred embodiment of the invention.

To give an idea about how the image merge function works in a handy scanner, please refer to the control flow as shown in FIG. 1:

101. Enable the image merge device.

102. Display the main window for the merge sub-functions.

103. Load the left and the right images to be merged.

104. If the image loading fails, cancel the merge request and quit.

105. If the images are successfully loaded, let the user select one of the two merge modes: manual or auto.

106. If the manual merge mode is selected, let the user move the images himself, and merge the two images according to his/her setting. Return the merged image and then quit.

107. If the auto merge mode is selected, the user can first change the optional settings then execute auto merge, or he/she can simply accept the default settings and execute auto merge directly. Adjusting the overlapped width can speed up the merge process. Changing the merge criteria will get more acceptable results.

108. Execute the main action of auto merge.

109. If auto merge succeeds, return the merged image and quit.

110. If the process fails, the user can either repeat the procedure from step 105 or quit from the merge request.

Figure 2:
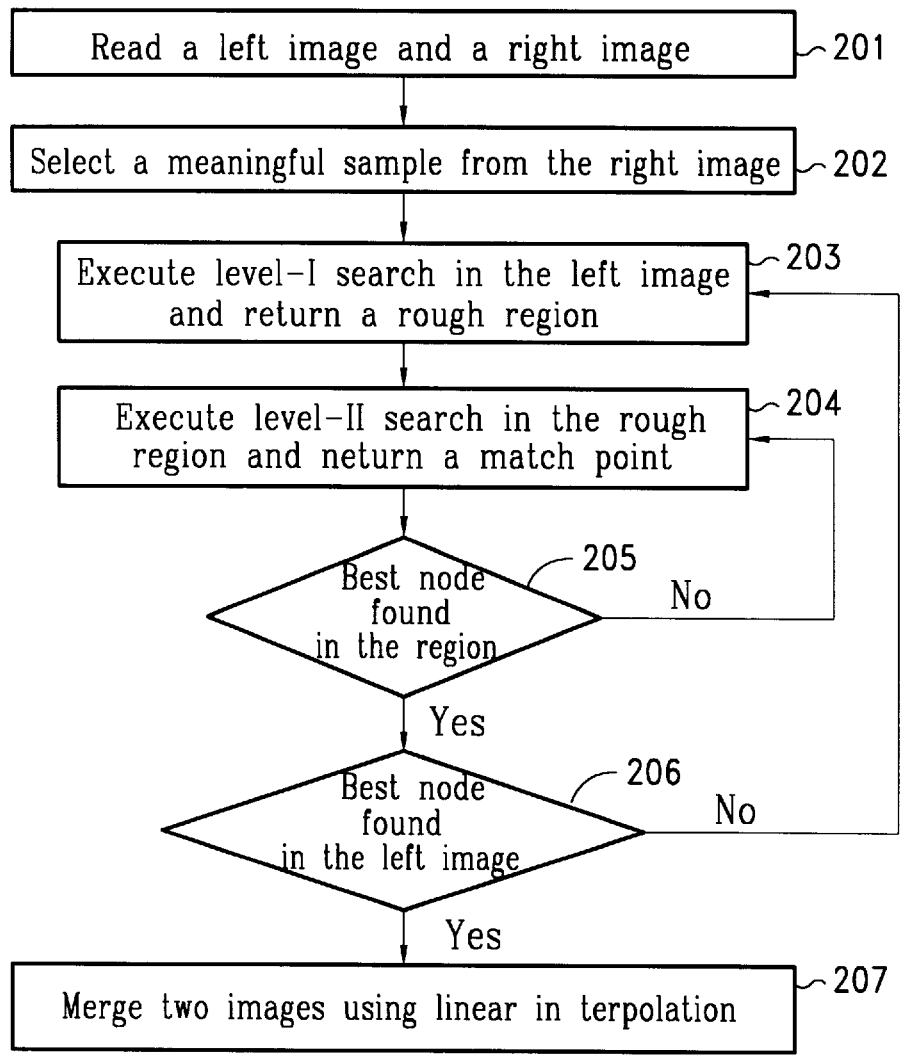
FIG. 2 is a flow chart showing the steps of the auto merge function according to the preferred embodiment of the present invention.

The invention mainly involves in the function of auto merge. To solve the problems occurred in the prior art, the invention intends to improve the accuracy of sample selection using fuzzy logic. Furthermore, the invention applies a two-level search method to speed up the search speed. In what follows, the method of sample selection and the two-level search method will be explained in detail. Refer to FIG. 2, the steps of automatic image merge as disclosed by the invention can be briefly stated as:

201. Reading a left image and a right image;

202. Selecting a meaningful sample (8×8 array of pixels) from the right image;

203. Applying level-I search to select a 16×16 array of pixels as a region in the left image whose estimate is roughly close to the sample;

204. Applying level-II search to select an 8×8 array of pixels as a node within the region and to compare with the sample;

205. Repeating 204 until a best node is found or all nodes in the region have been examined;

206. Repeating 203 until a best node is found or the search space for the left image exhausted;

207. If a best node is found, using linear interpolation to merge the two images according to the match points.

Figure 3B:
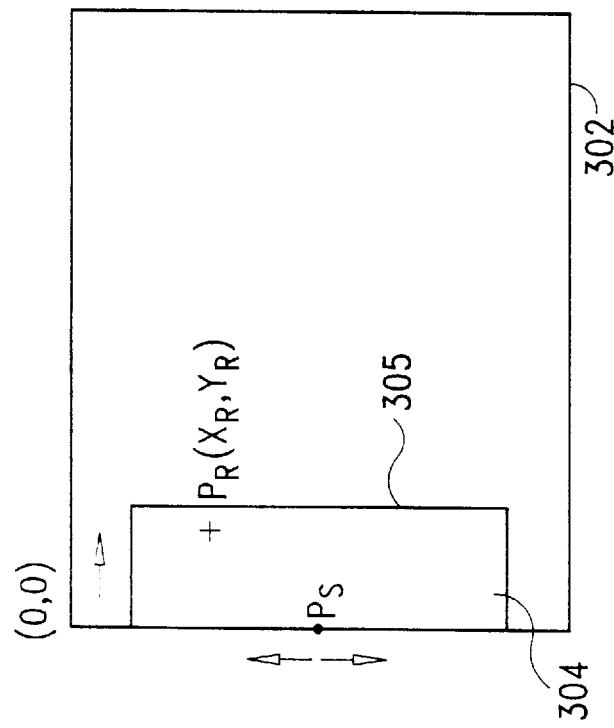
FIG. 3B is a schematic diagram showing the search spaces of the right image to be merged.
Figure 3A:
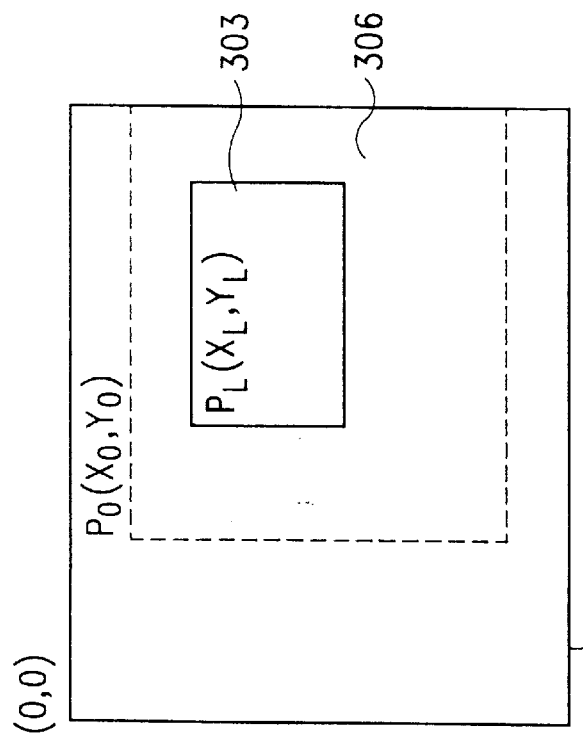
FIG. 3A is a schematic diagram showing the search spaces of the left image to be merged.

Refer to FIGS. 3A and 3B, let image 301 and image 302 be the left part and the right part of an image, respectively. According to the invention, the search space set for the right image 302 is the area 0.2 inch from the top and the bottom with the width of 0.4 inch. The maximum allowed search space for the left image 301 is the area 306 which is 0.2 inch from the top and the bottom with the width of 1.0 inch. The effective search space on the left image is the area 303 which is 0.6 inch×0.4 inch. The search for the meaningful sample starts from the pixel $P_S$ 305 and then goes upward and downward along the current vertical line. If no meaningful sample is found, it goes right to the next vertical line and repeats the same search until a meaningful sample is found, otherwise the search fails. Suppose the meaningful sample is the pixel $P_R(X_R,Y_R)$. The corresponding starting point on the effective search space of the left image will be $P_L(X_L,Y_L)$, where $X_L=X_O+X_R$, and $Y_L=Y_O+Y_R$. After the meaningful sample is found, the search space for the left image will be in the region defined by $P_L(X_L,Y_L)$. The detailed search method for the region and the match point will be explained more fully below in the part of level-I search and the level-II search.

To deal with the fuzzy property of a pixel, the selection of a meaningful sample starts from setting fuzzy pixels. The major advantage for setting fuzzy pixels is to set up a cut-off value which can be used to eliminate uncertain samples and thus speed up the search. Thus, the fuzzy set used in the invention is defined as containing the following fuzzy elements: {white pixel (1), fuzzy white pixel (1), fuzzy black pixel (0), black pixel(0)}. The numbers inside the parenthesis are the numeric representation for these fuzzy elements. When displayed on screen, 1's are drawn by white pixels and 0's are drawn by black pixels. The invention also defines "ColorThreshold" as the threshold level of the selected reference color which serves as the baseline. The fuzzy range going up and down from the baseline is defined as "FUZYRANGE" which has upper bounds (ColorThreshold+FUZYRANGE) and lower bounds (ColorThreshold−FUZYRANGE). According to the definition given above, a pixel may be converted into one of the four fuzzy elements:

(a) the pixel with the value of the reference color over the upper fuzzy bound will be converted to a white pixel;

(b) the pixel with the value of the reference color between the upper fuzzy bound and the baseline will be converted to a fuzzy white pixel;

(c) the pixel with the value of the reference color between the baseline and the lower fuzzy bound will be converted to a fuzzy black pixel; and (d) the pixel with the value of the reference color under the lower fuzzy bound will be converted to a black pixel.

Thus, a fuzzy pixel is a pixel of fuzzy whiteness or fuzzy blackness. This definition indicates that for the fuzzy pixels of the same reference color, some of them can be traced as white pixels, yet the others can be converted to black pixels depending on their locations.

After defining the threshold level and fuzzy range for a fuzzy pixel, the search of the meaningful sample starts from mapping an 8×8 array of pixels. In numeric expression, the mapping can be expressed this way:

Let i and j represent the vertical and horizontal coordinates of an image from 0 to 7. S(i, j) represents a sample which is an 8×8 array of pixels. The range of a sample is thus $0 \leq S_{ij} \leq 255$. Then, map pixels in a sample to a comparable reference R.

$$R_{ij} = \mathrm{Map}(S_{ij});$$

$$\mathrm{Map}(S_{ij}) = \begin{cases} 0, & \text{if } S_{ij} < i\mathrm{Threshold} - i\mathrm{FuzzyRange}; \\ \mathrm{Fuzzy}, & \text{if } i\mathrm{Threshold} - i\mathrm{FuzzyRange} \leq \\ & S_{ij} \leq i\mathrm{Threshold} + i\mathrm{FuzzyRange}; \\ 1 & \text{if } S_{ij} > i\mathrm{Threshold} + i\mathrm{FuzzyRange}; \end{cases}$$

Let $$i\mathrm{Ones} = \sum_{i=0}^{7} \sum_{j=0}^{7} 1, \text{ if } R_{ij} = 1;$$

$$i\mathrm{Zeros} = \sum_{i=0}^{7} \sum_{j=0}^{7} 1, \text{ if } R_{ij} = 0;$$

$$i\mathrm{Fuzzy} = \sum_{i=0}^{7} \sum_{j=0}^{7} 1, \text{ if } R_{ij} = \mathrm{Fuzzy}.$$

Therefore, if a sample satisfies the following conditions, then that sample is meaningful:

iOnes<iMaxOnes;

iZeros<iMaxZeros; and iFuzzy<iMaxFuzzy.

In other words, a meaningful sample is an 8×8 array of pixels which has the number of fuzzy pixels less than the maximum allowed number of fuzzy pixels, and the number of white pixels between the minimum and the maximum allowed number of white pixels.

Figure 4A:
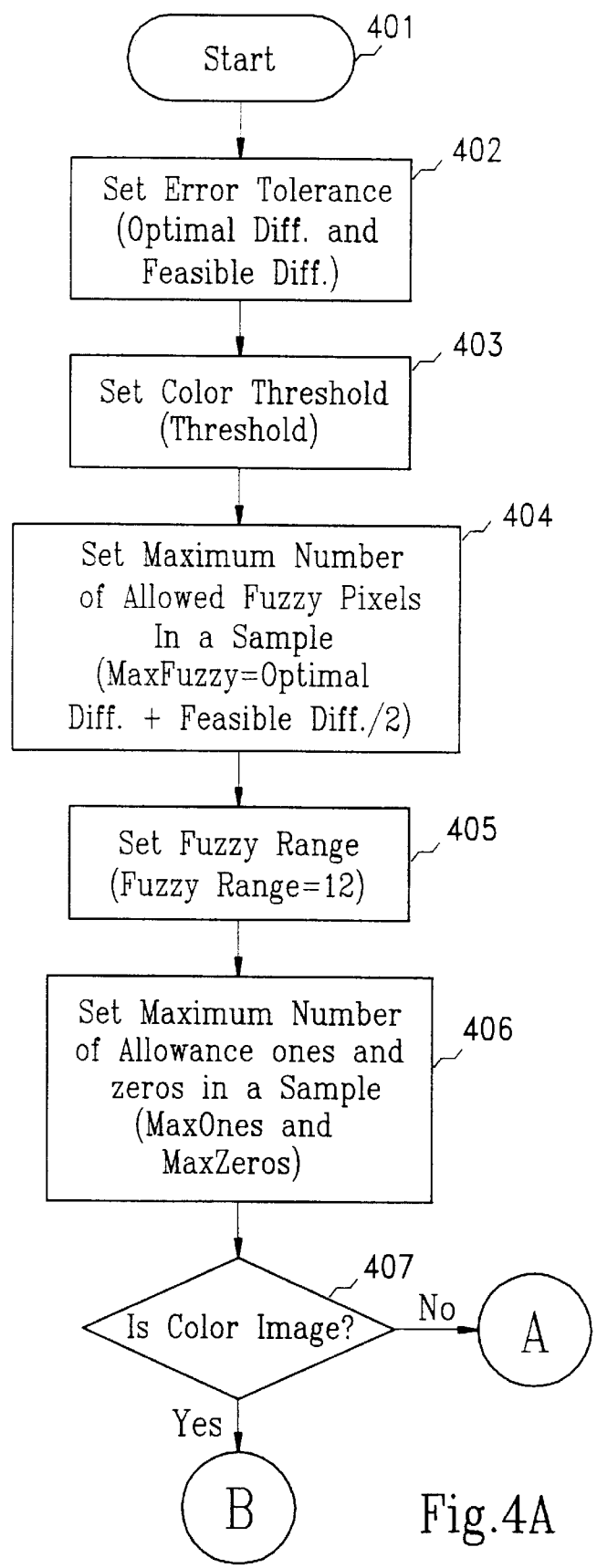
FIGS. 4A, 4B and 4C comprise a flow chart showing the steps of searching a sample according to the method of the invention.
Figure 4B:
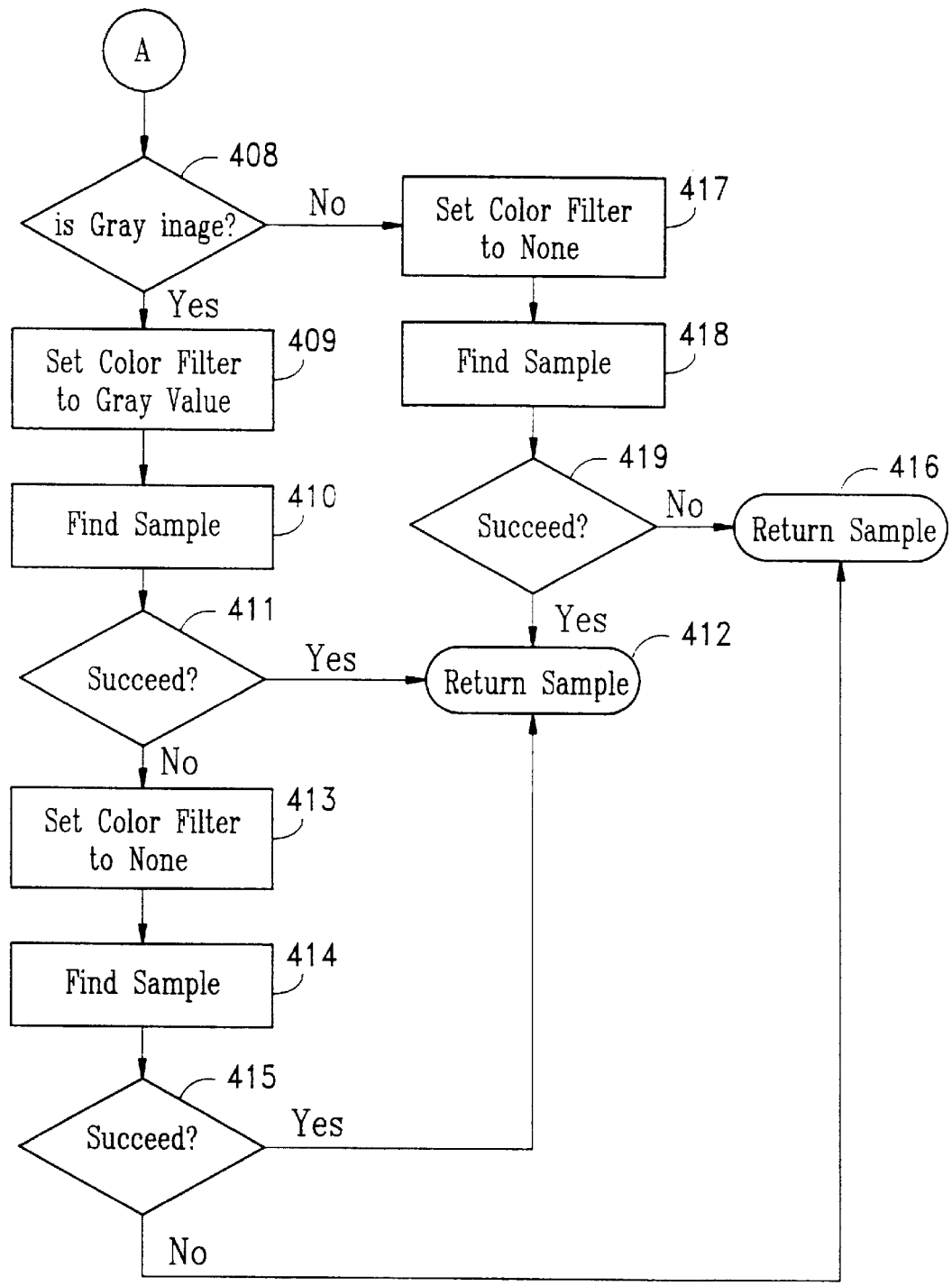
Figure 4C:
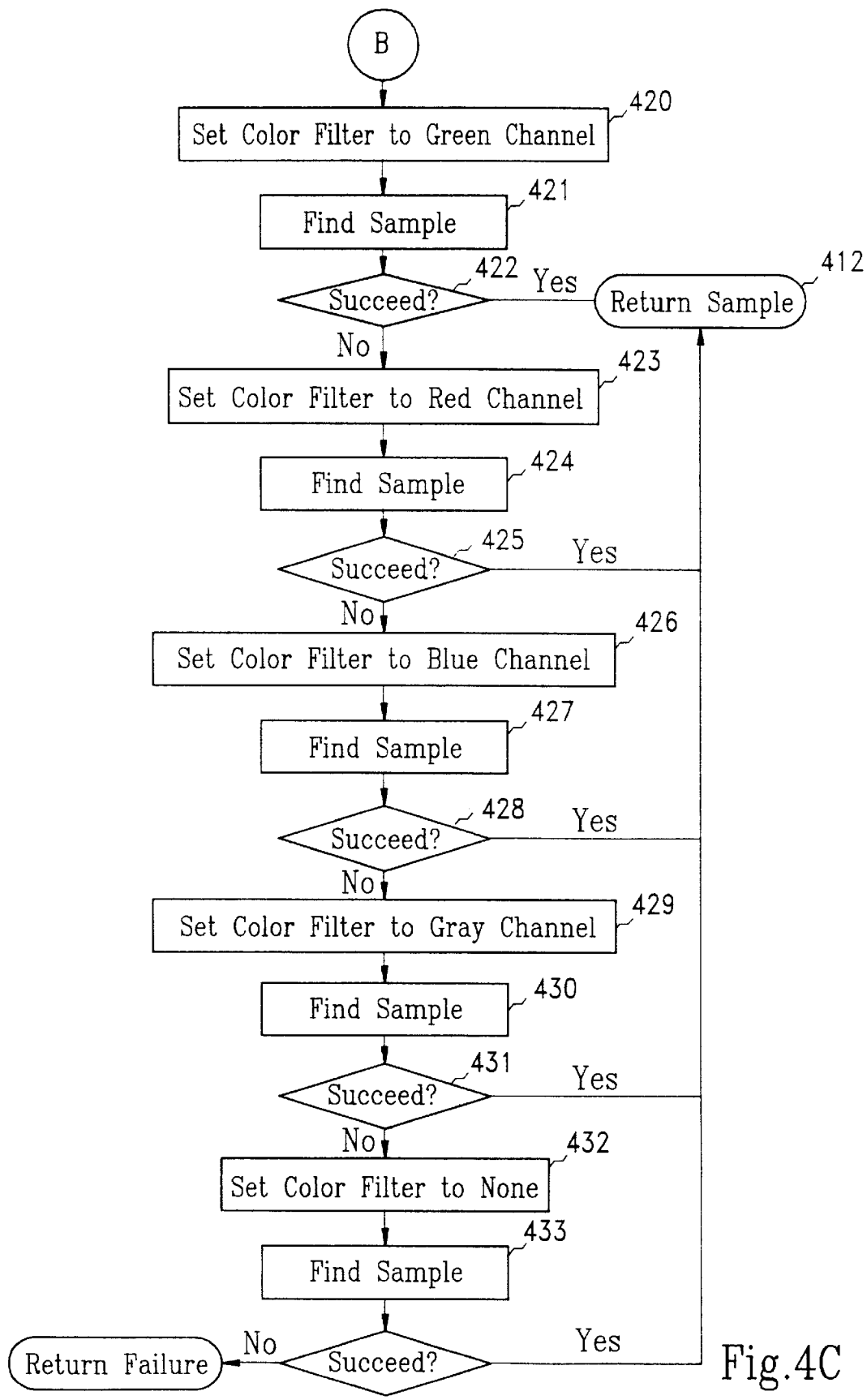

Referring to FIGS. 4A, 4B, and 4C, the steps of searching a sample is summarized in more detail below:

401: start;

402: set error tolerance (iOptimalDifference and iFeasibleDifference);

403: set color threshold (iThreshold);

404: Set maximum number of allowed fuzzy pixels in a sample (iMaxFuzzy=(iOptimalDifference+iFeasibleDifference)/2);

405: Set FuzzyRange (iFuzzyRange=12);

406: Set Maximum number of allowed ones and zeros in a sample (iMaxOnes and iMaxZeros); note that MaxOnes for text is defined as 42, 44 for gray, and 48 for color; MaxZeros for text is defined as 58, 56 for gray, and 52 for color;

407: If it is color image, goes to step 420; if not, goes to step 408;

408: If it is gray image, goes to step 409; if not, goes to step 417

409: Set color filter to gray value;

410: Find sample;

411: If succeed, go to step 412; if not, goes to step 413;

412: Return sample and stop;
413: Set color filter to none;
414: Find sample;
415: If succeed, go to step 412; if not, go to step 416;
416: Return failure;
417: Set color filter to none;
418: Find sample;
419: If succeed, go to step 412; if not, go to step 420;
420: Set color filter to green channel;
421: Find sample;
422: If succeed, go to step 412; If not, go to step 423;
423: Set color filter to red channel;
424: Find sample;
425: If succeed, go to step 412; if not, go to step 426;
426: Set color filter to blue channel;
427: Find sample;
428: If succeed, go to step 412; if not, go to step 429;
429: Set color filter to gray value;
430: Find sample;
431: If succeed, go to step 412; if not, go to step 432;
432: Set color filter to none;
433: Find sample;
434: If succeed, go to step 412; if not, return failure and stop.

After the meaningful sample is selected, it has to be compared with each node of the region in the left image. The invention applies a two-level search to speed up the search for finding a match point in the left image. The level-I search finds a rough region which acts as a filter to eliminate regions which is not likely to contain a match point. The level-II search performs more detailed search and finds the match point accurately.

The two-level search mechanism is a modification of A* algorithm which is the best-search approach. Its main idea is to estimate the cost of finding the goal from the current state and then go with the optimal path found so far. Since the estimate may not always be correct or close, the search can jump from one path to another as soon as a better one is found. No step-by-step backtracking is necessary. The great promise for the invention is that if there exists an optimal solution, the invention guarantees to find it at the minimum search cost.

The invention employs two estimate functions, one for the level-I search, and the other for the level-II search. Before getting into the details of the estimate functions, a few terminology must be defined. Let S[8,8] be the array of the reference elements of the pixels in the sample selected from the right image, N[8,8] be the array of the reference elements of the pixels in the node under check from the left image, and Difference(P1,P2) be the difference function such that $$\text{Difference}(P1, P2) = \begin{cases} 0, & \text{if } P1 = P2, \text{ or one or both are fuzzy pixels,} \\ 1, & \text{otherwise} \end{cases}$$

where P1 is the reference element of a pixel in the sample, and P2 is the reference element of a pixel in the node.

The invention also defines the following notation. Let $R_0$ denote the starting region created, and $R_p$ denote the parent region of R. Also, let $N_0$ denote the first node created in $R_p$, and $N_{Best}$ denote the best solution found in $R_p$. The estimate function, $Est_1(R)$, of the region for level-I search can then be defined as:

$$Est_1(R) = \begin{cases} 0, \text{ if } R = R_0; \\ Est_2(N) \times \text{Distance}(R, R_p, N), \text{ otherwise}; \end{cases}$$

where $$N = \begin{cases} N_0, \text{ if } R \text{ is a bad region,} \\ N_{Best}, \text{ otherwise,} \end{cases}$$

and Distance(R,$R_p$, N) is the distance function defined as (Distance$_x$(R, $R_p$, N)+Distance$_y$(R, $R_p$, N))/Distance$_{Total}$, wherein (Distance$_x$(R, $R_p$, N) is the distance between the center pixel of R and the upper-left pixel of N in $R_p$ in the x-coordinate;

(Distance$_y$(R, $R_p$, N) is the distance between the center pixel of R and the upper-left pixel of N in $R_p$ in the y-coordinate; and Distance$_{Total}$ is assigned 24.

It is important to explain how the region and its child regions are created based on the estimate defined above. FIG. 5A shows the relative positions between the parent region and its child regions. A region is composed of four cells, each of which is an 8×8 array of pixels. For example, the region $R_4$ consists of $C_{11}$, $C_{12}$, $C_{21}$ and $C_{22}$. Suppose $R_p$ is the parent region which consists of $C_{22}$, $C_{23}$, $C_{32}$, and $C_{33}$, then the child regions of $R_p$ can be created in the order of $R_1$, $R_2$, $R_3$, $R_4$, $R_5$, $R_6$, $R_7$, $R_8$. Each child region is either newly created or has existed already. Then, each newly created region is assigned an estimate by the function defined above. As for each recreated region, a new estimate is computed and compared with the old estimate. Since the method of the invention guarantees to find the optimal path, the smaller estimate will be assigned to the recreated region. The whole region queue is then resorted according to the increasing value of the estimates. Then, the region with the smallest estimate will be picked as the next parent region. Another important part about region creation is that there are three starting regions created. This design is to prevent from finding local optimum.

For the level-II search, the estimate function $Est_2(N)$ of any node, N, in the region under check is defined as:

$$Est_2(N) = \sum_{i=1}^{8} \sum_{j=1}^{8} \text{Difference}(S[i, j], N[i, j]).$$

The creation of child nodes is more complicated than that of child regions. The approach attempts to simulate the real matching process performed by human beings, that is, find a rough match first and then do the actual match with more careful adjustment. FIG. 5A shows a sample of a region, i.e. a 16×16 array of pixels. A node in a region, as defined earlier, is an 8×8 array of pixels, denoted as N[$r_1$,$c_1$,$r_2$,$c_2$], where P($r_1$,$c_1$), P($r_1$,$r_2$), P($r_2$, $c_1$) and P($r_2$, $c_2$) represent the four pixels at the four positions of the nodes, where 1<=$r_1$<=8, 8<=$r_2$<=15, 1<=$c_1$<=8, 8<=$c_2$<=15.

The 8×8 array of pixels framed by the square of bold line shown in FIG. 5B defines a node which is denoted as $N_0$(=N[1,1,8,8]) and is always the starting node created in each region. To match the selected sample with the nodes in a region is to move the square around and find the node which matches the meaningful sample the best. Consequently, there will be 64 nodes created and checked in the worst case.

Figure 5C:
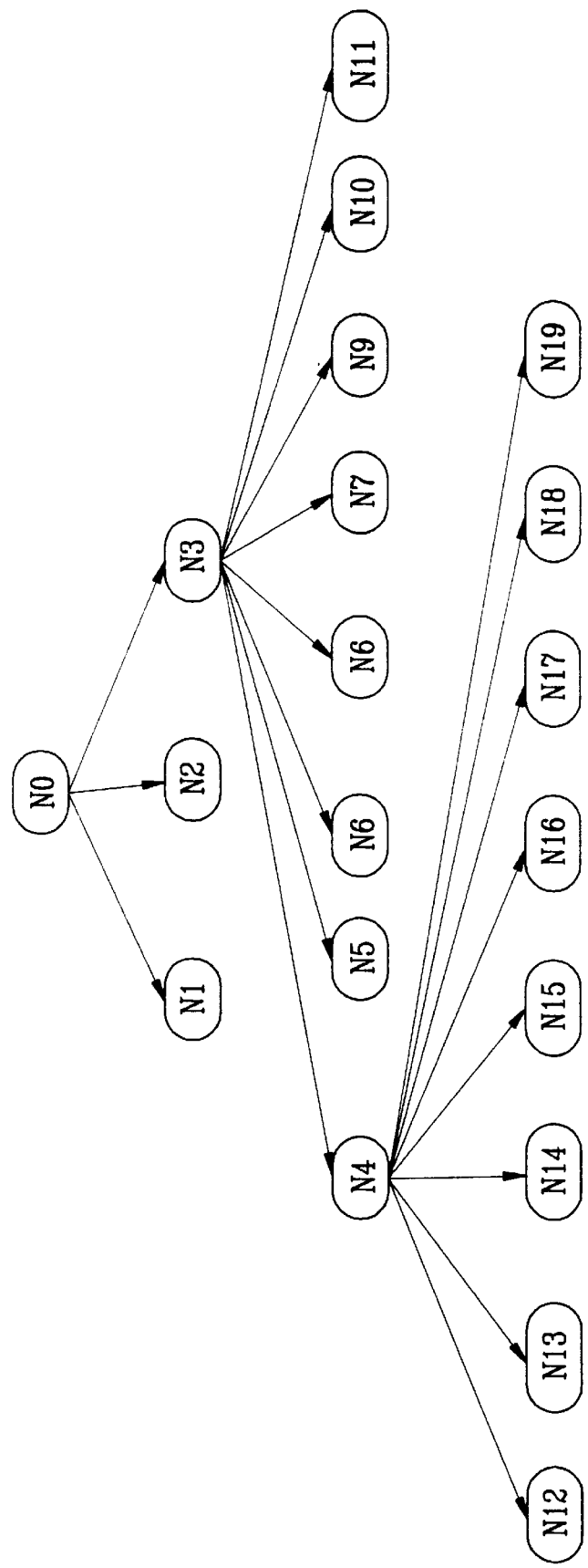
FIG. 5C is a schematic diagram showing a partial tree of the sample region of FIG. 6 according to the method of the invention.

It is helpful to understand the detailed manipulation of nodes in the node queue. FIG. 5C shows one partial tree of child nodes in the region of FIG. 5A. All nodes are classified in four levels, from depth 1 to depth 4, and stored in a node queue. The starting node $N_1$ is always the root of this tree and is the only node at the level of depth 1. $N_0$ has three child nodes, in the order of their creation: $N_1$, $N_2$, and $N_3$, which are at the level of depth 2. In the case shown in FIG. 5B $N_3$ is picked and its eight child nodes ($N_4$, $N_5$, $N_6$, $N_7$, $N_8$, $N_9$, $N_{10}$, $N_{11}$) are created in the same order as the creation of child regions. These are the nodes at the level of depth 3. Then, $N_4$ is the next parent node and it also has eight child nodes created: $N_{12}$, $N_{13}$, $N_{14}$, $N_{15}$, $N_{16}$, $N_{17}$, $N_{18}$, $N_{19}$, which are located at the level of depth 4. Please note that the index i of node $N_i$ is not fixed for each node. It depends on the original order of the node when it is first created. If $N_1$ is picked as the parent node at the level of depth 2, the child nodes created will be $N'_4$, $N'_5$, $N'_6(=N_4)$, $N'_7(=N_7)$ and $N'_8(=N_8)$. If $N_2$ is picked as the parent node at the level of depth 2, the child nodes created will be $N''_4$, $N''_5(=N_5)$, $N''_6(=N_7/N'_7)$, $N''_7$ and $N''_8(=N_{10})$. Nevertheless, the four-level classification of nodes is fixed. The following rules are defined for the creation of child nodes:

Rule 1: $N_0$ is the only node at the level of depth 1.

Rule 2: For any node $N[r_{n1}, c_{n1}, r_{n2}, c_{n2}]$ at the level of depth D, $1<D<=4$, let $N[r_{p1}, c_{p1}, r_{p2}, c_{p2}]$ be N's parent at the level of depth (D-1), then $$r_{n1}=r_{p1}+O[i,0]\times2^{(4-D)}, 1<=r_{n1}<=8,$$

$$c_{n1}=c_{p1}+O[i,1]\times2^{(4-D)}, 1<=c_{n1}<=8,$$

$$r_{n2}=r_{n1}+7, \text{ and}$$

$$c_{n2}=c_{n1}+7,$$

where O[8,2] is the coefficient array. Each pair of O[i,0] and O[i,1], $1<=i<=8$, are for computing the child nodes at the relative position i, as shown in FIG. 5A. The values of the elements in the coefficient array are listed in the following table.

| i/i | 1 | 2 | 3 | 4 | 5 | 6 | 7 | 8 |
|---|---|---|---|---|---|---|---|---|
| 1 | 0 | -1 | 1 | -1 | 1 | 0 | -1 | 1 |
| 2 | -1 | 0 | 0 | -1 | -1 | 1 | 1 | 1 |

For instance, $N_1=N[r_1, c_1, r_2, c_2]$ is created in the position of 3, and is one of the child nodes at the level of depth 2. Since the parent of $N_1$ is the root $N_0$ which is N[1,1,8,8], then $N_1$ will be N[5,1,12,8] according to the following computation:

$$r_1=1+O[3,0]\times2^2=5,$$

$$c_1=1+O[3,1]\times2^2=1,$$

$$r_2=5+7=12, \text{ and}$$

$$c_2=1+7=8.$$

Figure 6:
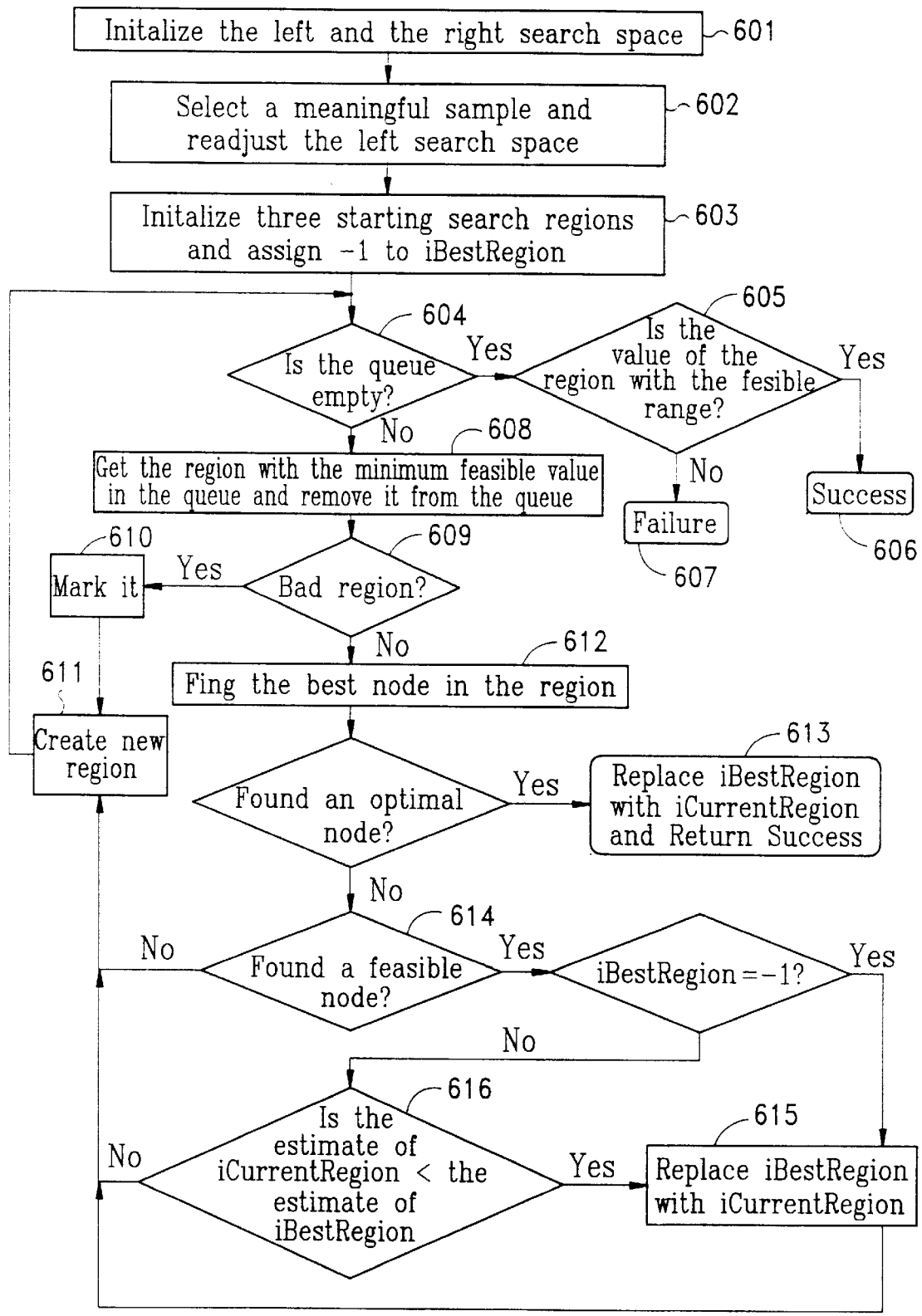
FIG. 6 is a flow chart showing the steps of the level-I search.

To sum up, the level-I search is executed by the following steps as shown in FIG. 6:

601. Initialize the left and the right search space;

602. Select a meaningful sample of 8×8 pixels within the right search space with the origin of P, and readjust the left search space;

603. Initialize three starting search regions and assign -1 to iBestRegion;

604. Check if the queue of region is empty;

605. If the queue is empty, check if the value of the region is within the feasible range;

606. If the value of region is within the feasible range, return success.

607. If not, return failure;

608. If the region queue is not empty, get the region with the minimum estimate value in the queue, assign it to iCurrentRegion and remove it from the queue;

609. Check if it is a bad region,

610. If it is a bad region, mark it as "CHECKED"; and go to step 611;

611. Create new region; and go to step 604;

612. If it is not a bad region, find the best node in this region using level-II search;

613. If an optimal node is found, replace the value of iBestRegion with the value of iCurrentRegion and return success;

614. If not an optimal node is found, check if a feasible node is found;

615. If the value of iBestRegion is equal to -1, replace iBestRegion with iCurrentRegion; go to 611;

616. If the value of iBestRegion is not equal to -1, check if the value of iCurrentRegion is smaller than iBestRegion. If yes, replace iBestRegion with iCurrentRegion; go to step 611. If no, go to 611.

Figure 7:
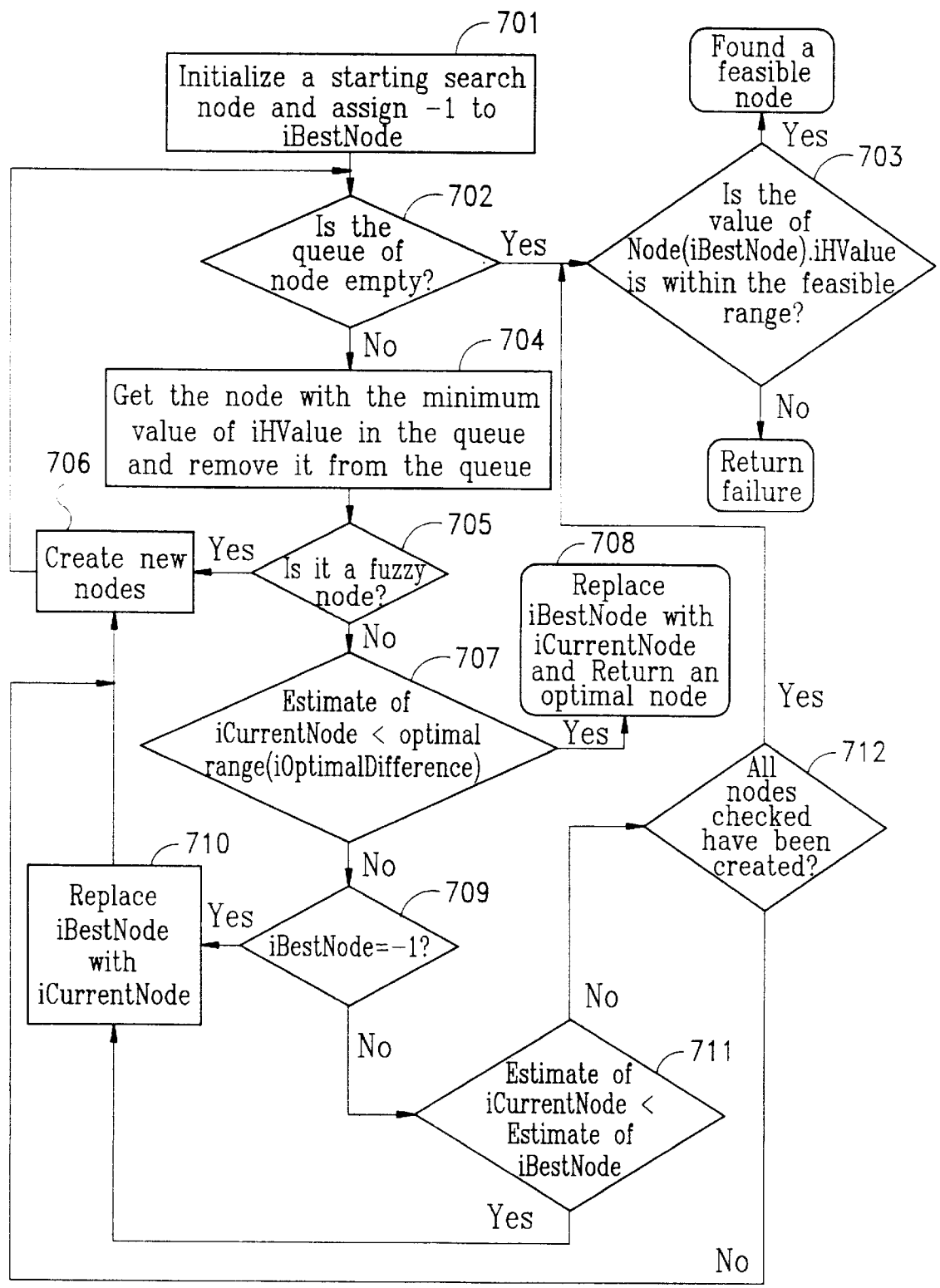
FIG. 7 is a flow chart showing the steps of the level-II search.

Refer to FIG. 7, the steps for the level-II search are as follows:

701. Initialize a starting search node and assign -1 to iBestNode;

702. Check if the queue of node is empty;

703. If the queue is empty, and if the value of iBestNode is within the feasible range (iFeasibleDifference), then return found a feasible node, otherwise return failure;

704. If the queue is not empty, then get the node with the minimum estimate value, assign it to iCurrentNode and remove it from the queue;

705. Check if this is a fuzzy node; if it is a fuzzy node, go to step 706; otherwise, go to step 707;

706. Create new nodes and go to step 702;

707. Check if the estimate value of iCurrentNode is within the optimal range (iOptimalDifference);

708. If the estimate value of iCurrentNode is within the optimal range (iOptimalDifference), replace iBestNode with iCurrentNode and return an optimal node;

709. Check if iBestNode is equal to -1;

710. If iBestNode is equal to -1, replace iBestNode with iCurrentNode; go to 706;

711. If iBestNode is not equal to -1, check if the estimate value of iCurrentNode is smaller than that of iBestNode; if yes, replace iBestNode with iCurrentNode; go to step 706; if no, go to 712;

712. Further check if all nodes checked have been created; if yes, go to step 703; if no, go to 706.

When the match point is found, the left image and the right image can be merged using linear interpolation. After a few experimentation, the results show that the invention can significantly improve the image merge speed and accuracy. It should be understood that various alternatives to the structures described herein may be employed in practicing the present invention. It is intended that the following claims define the invention and that the structure within the scope of these claims and their equivalents be covered thereby.

What is claimed is:

1. A method for automatically merging a first image and a second image, wherein said first image and said second image are overlapped, comprising the steps of:

a. selecting a meaningful sample from said second image;

b. selecting an array of pixels as a parent region from said first image, said parent region having a plurality of child regions;

c. storing said parent region and said child regions in a region queue;

d. comparing each region in said region queue with said meaningful sample according to a first estimate function;

e. returning a region with an estimate close to that of said meaningful sample;

f. creating a node queue based on said region queue;

g. comparing the pixels in each node of said node queue with said meaningful sample;

h. defining and returning a node as a match point if said node is within a minimum error tolerance; and i. merging said first image with said second image based on said match point.

2. The method as claimed in claim 1, wherein said step (a) of selecting a meaningful sample comprises the steps of:

predetermining a fuzzy range and a color threshold for fuzzy pixels; and selecting an 8×8 array of pixels which has the number of fuzzy pixels less than the maximum allowed number of fuzzy pixels, and the number of white pixels between the minimum and the maximum allowed number of white pixels.

3. The method as claimed in claim 1, wherein said step (b) comprises the steps of:

predetermining a 16×16 array of pixels as a parent region;

dividing said 16×16 array of pixels into four nodes each having 8×8 array of pixels; and creating child regions of said parent region.

4. The method as claimed in claim 1, wherein said step (d) comprises the steps of:

computing the difference between the reference elements of the pixels in said meaningful sample and in said nodes of said region according to said first estimate function;

predetermining a first error tolerance for setting the allowable number of the differences in said reference elements of the pixels in said meaningful sample and said node;

computing an estimate for each region in said region queue;

sorting said region queue according to the increasing value of estimates; and creating a new region, if none of the region in said region queue has an estimate close to that of said meaningful sample.

5. The method as claimed in claim 4, wherein said reference element of a pixel is one of the elements in the fuzzy set defined for said fuzzy pixels.

6. The method as claimed in claim 4, wherein said step of creating a new region comprises the steps of:

selecting the region with the smallest estimate as the next parent region;

storing said new parent region and its child regions in a new region queue.

7. The method as claimed in claim 1, wherein said steps (d) and (e) repeat until a region with an estimate close to that of said meaningful sample is found or the search space for said first image is exhausted.

8. The method as claimed in claim 1, wherein said step (g) comprises the steps of:

computing the difference between the reference elements of the pixels in said meaningful sample and in said nodes of said rough region according to said second estimate function;

predetermining a second error tolerance for setting the allowable number of differences in said reference elements of the pixels in said meaningful sample and in said node of said rough region;

computing an estimate for each node of said node queue;

sorting said node queue according to the increasing value of estimates;

creating a new node queue if none of nodes in said node queue is within the minimum error tolerance.

9. The method as claimed in claim 8, wherein said step of creating a new node queue comprises the steps of:

classifying all nodes in said region queue into four levels;

rearranging said nodes in said region queue in a predetermined order; and storing said nodes in said node queue.

10. The method as claimed in claim 1, wherein said step (g) repeats until a node with the minimum error tolerance is found or all nodes in said region have been examined.

11. The method as claimed in claim 1, wherein said step (i) of merging said first image data and said second image data is linear interpolation.

12. A method for automatically merging a first image and a second image, wherein said first image and said second image are overlapped, comprising the steps of:

a. selecting a meaningful sample from said second image;

b. selecting a parent region from said first image, said parent region having a plurality of child regions;

c. comparing said parent region with said meaningful sample and returning a rough region having an estimate close to said meaningful sample according to a first A* estimate function;

d. comparing said meaningful sample with said rough region and returning a match point according to a second A* estimate function;

e. repeating said step (c) until a best node is found or all nodes in said parent region have been examined;

f. repeating said step (d) until a best node is found or the search space for said second image is exhausted; and g. applying linear interpolation to merge said first image data with said second image data based on said match point.

13. The method as claimed in claim 12, wherein said step (a) of selecting a meaningful sample comprising the steps of:

predetermining a fuzzy range and a color threshold for fuzzy pixels; and selecting an 8×8 array of pixels which has the number of fuzzy pixels less than the maximum allowed number of fussy pixels, and the number of white pixels between the minimum and the maximum allowed number of white pixels.

14. The method as claimed in claim 12, wherein said step (b) of selecting a parent region further comprising the steps of:

predetermining a 16×16 array of pixels as a parent region;

dividing said 16×16 array of pixels into four nodes each having 8×8 array of pixels;

creating child regions of said parent region; and storing said parent region and said child regions in a region queue.

15. The method as claimed in claim 12, wherein said step (c) of comparing said parent region with said meaningful sample comprises the steps of:

computing the difference between the reference elements of the pixels in said meaningful sample and in said nodes of said parent region according to said first A* estimate function;

predetermining a first error tolerance for setting the allowable number of differences in said reference elements of the pixels in said meaningful sample and said node;

computing an estimate for each region in said region queue;

sorting said region queue according to the increasing value of estimates;

comparing each region of said region queue with said meaningful sample;

returning a region from said region queue if said region has an estimate close to that of said meaningful sample; and creating a new region, if none of the region in said region queue has an estimate close to that of said meaningful sample.

16. The method as claimed in claim 15, wherein said step of creating a new region comprising the steps of:

selecting the region with the smallest estimate as the next parent region;

storing said new parent region and its child regions in a new region queue.

17. The method as claimed in claim 12, wherein said step (d) of returning a match point comprises the steps of:

computing the difference between the reference elements of the pixels in said meaningful sample and in said nodes of said rough region according to said second A* estimate function;

predetermining a second error tolerance for setting the allowable number of differences in said reference elements of the pixels in said meaningful sample and in said node of said rough region;

creating a node queue based on said region queue;

computing an estimate for each node of said node queue;

sorting said node queue according to the increasing value of estimates;

comparing the reference elements of the pixels in each node of said node queue with said meaningful sample;

returning a node from said node queue if said node is within the minimum error tolerance;

creating a new node queue if none of the nodes in said node queue is within the minimum error tolerance; and defining said node with the minimum error tolerance as the match point.

18. The method as claimed in claim 17, wherein said step of creating a node queue comprising the steps of:

classifying all nodes in said region queue into four levels;

rearranging said nodes in said region queue in a predetermined order; and storing said nodes in said node queue.

* * * * *